(12) United States Patent
Salomon et al.

(10) Patent No.: US 11,608,292 B2
(45) Date of Patent: Mar. 21, 2023

(54) PROCESS FOR THE MANUFACTURE OF AN INSULATING PRODUCT BASED ON MINERAL FIBRES

(71) Applicant: SAINT-GOBAIN ISOVER, Courbevoie (FR)

(72) Inventors: Pierre Salomon, Courbevoie (FR); Joël Azevedo, Gif sur Yvette (FR); Boris Jaffrennou, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 16/624,175

(22) PCT Filed: Jun. 4, 2018

(86) PCT No.: PCT/FR2018/051288
§ 371 (c)(1),
(2) Date: Dec. 18, 2019

(87) PCT Pub. No.: WO2018/234652
PCT Pub. Date: Dec. 27, 2018

(65) Prior Publication Data
US 2020/0172435 A1 Jun. 4, 2020

(30) Foreign Application Priority Data
Jun. 23, 2017 (FR) ...................................... 1755761

(51) Int. Cl.
*C03C 25/32* (2018.01)
*C03C 3/062* (2006.01)
(Continued)

(52) U.S. Cl.
CPC .............. *C03C 25/32* (2013.01); *C03C 3/062* (2013.01); *C03C 3/087* (2013.01); *C03C 25/14* (2013.01);
(Continued)

(58) Field of Classification Search
CPC .... C03C 25/14; C03C 25/32; C03C 2218/112
See application file for complete search history.

(56) References Cited

U.S. PATENT DOCUMENTS 2,619,475 A 11/1952 Kovreg
5,534,612 A * 7/1996 Taylor .................... C03C 25/26
528/145
(Continued)

FOREIGN PATENT DOCUMENTS

FR 2 443 436 A1 7/1980
FR 2 500 492 A1 8/1982
(Continued)

OTHER PUBLICATIONS

International Search Report as issued in International Patent Application No. PCT/FR2018/051288, dated Oct. 4, 2018.
(Continued)

*Primary Examiner* — Nathan H Empie
(74) *Attorney, Agent, or Firm* — Pillsbury Winthrop Shaw Pittman LLP

(57) ABSTRACT

A process for the manufacture of an insulating product based on mineral fibres bonded by an organic binder, includes applying a sizing composition to the mineral fibres, forming an assembly of the mineral fibres, heating the assembly of mineral fibres until the sizing composition has cured, wherein the sizing composition includes the following constituents within the limits defined below, expressed as fractions by weight with respect to the total weight of the composition: from 80% to 98% of water, from 2% to 20% of water-soluble poly(furfuryl alcohol) and less than 0.5% of furfuryl alcohol, and the mineral fibres are fibres of aluminosilicate glass including aluminum oxide, $Al_2O_3$, in a fraction by weight of between 14% and 28%.

19 Claims, 2 Drawing Sheets

(51) Int. Cl.
*C03C 3/087* (2006.01)
*C03C 25/14* (2018.01)
*E04B 1/74* (2006.01)

(52) U.S. Cl.
CPC ............ *E04B 1/74* (2013.01); *C03C 2213/00* (2013.01); *C03C 2217/445* (2013.01); *C03C 2218/112* (2013.01); *E04B 2001/742* (2013.01)

(56) References Cited

U.S. PATENT DOCUMENTS

| | | | | |
|---|---|---|---|---|
| 5,589,536 | A | * | 12/1996 | Golino .................... C03C 25/26 524/494 |
| 2005/0085369 | A1 | * | 4/2005 | Jensen .................... C03C 13/06 501/35 |
| 2011/0260094 | A1 | | 10/2011 | Hampson et al. |

FOREIGN PATENT DOCUMENTS

| | | | |
|---|---|---|---|
| FR | 2 529 878 A1 | 1/1984 | |
| FR | 2 579 196 | 9/1986 | |
| GB | 565 340 A | 11/1944 | |
| WO | WO 91/10626 A1 | 7/1991 | |
| WO | WO-9908970 A1 * | 2/1999 | ............ C03C 13/06 |
| WO | WO 2009/080938 A2 | 7/2009 | |
| WO | WO 2012/072938 A1 | 6/2012 | |
| WO | WO 2012/168619 A1 | 12/2012 | |

OTHER PUBLICATIONS

Sebastian, K., "EURIMA test guideline: In-vitro acellular dissolution of man-made vitreous silicate fibres," Glass. Sci. Technol. vol. 75, No. 5,(2002), pp. 263-270.

Marques, M. R. C., et al., "Simulated Biological Fluids with Possible Application in Dissolution Testing," Dissolution Technologies, Aug. 2011, 14 pages.

* cited by examiner

PROCESS FOR THE MANUFACTURE OF AN INSULATING PRODUCT BASED ON MINERAL FIBRES

CROSS-REFERENCE TO RELATED APPLICATIONS

This application is the U.S. National Stage of PCT/FR2018/051288, filed Jun. 4, 2018, which in turn claims priority to French patent application number 1755761 filed Jun. 23, 2017. The content of these applications are incorporated herein by reference in their entireties.

The present invention relates to a process for the manufacture of an insulating product based on mineral fibres bonded by a biosourced organic binder. The process makes possible in particular the manufacture of an insulating product comprising mineral fibres which are sensitive to acids without the said fibres being detrimentally affected by the acidity of the organic binder. The invention also relates to the products obtained by such a process.

The manufacture of insulating products based on mineral fibres generally comprises a stage of manufacture of the fibres and a stage of assembling the said fibres using a sizing composition.

The fibres can be manufactured by different processes. The most widely known method is centrifugal fiberizing (FR 2 500 492, FR 2 579 196, WO9110626, FR 2 443 436, FR 2 529 878), in which the molten mineral material is projected onto centrifuging wheels (FR 2 500 492, FR 2 579 196, WO9110626) or onto the walls of a centrifuge provided with a multitude of orifices (FR 2 443 436, FR 2 529 878) in order to form filaments under the action of centrifugal force. The filaments formed are subsequently drawn and then transported towards a receiving member in order to be deposited in the form of a web or of a mat of mineral fibres (or mineral wool).

In order to provide the web of fibres with a degree of cohesion, the fibres are coated with a sizing composition containing a thermosetting resin. A heat treatment, at a temperature generally of greater than 100° C., makes it possible to carry out the curing or the polycondensation of the resin and to thus obtain a thermal and/or acoustic insulating product having specific properties, in particular a dimensional stability, a tensile strength and a thickness recovery after compression. The sizing composition to be projected onto the mineral wool is generally provided in the form of an aqueous solution containing the thermosetting resin and additives, such as in particular a catalyst for the crosslinking of the resin, an adhesion-promoting silane and a dust-preventing mineral oil. The sizing composition is generally applied to the fibres by spraying.

Regulations relating to human health and the environment expressly require or encourage the resin or the compounds which it contains or generates to have a reduced impact on the environment and the mineral fibres to be described as non-carcinogenic.

The thermosetting resins most commonly used in the manufacture of insulating products based on mineral fibres are formaldehyde-based resins (urea/formaldehyde, phenol/formaldehyde, melamine/formaldehyde resins). These resins are relatively inexpensive, soluble in water and capable of crosslinking under the abovementioned thermal conditions. However, they may still contain a certain proportion of free formaldehyde, the harmful effects of which are established by toxicological studies. These resins then form the subject of a treatment with urea in order to fix this free formaldehyde in the form of nonvolatile condensates. In point of fact, these condensates are unstable under the temperature conditions to which the webs of glass fibres are subjected. They may decompose to give formaldehyde and ammonia (itself produced from the degradation of the urea) which are released into the treatment atmosphere and then have to form the subject of capturing procedures in order to reduce their impact on the environment. Solutions for replacing formaldehyde-based resins in sizing compositions have been developed. A large number of them are based on the use of polymers of carboxylic acids and/or of saccharides (WO2012168619, WO2012072938, WO2009080938, US2011260094), ideally prepared from natural compounds resulting from sources which are renewable in the short term, in particular plant sources, or produced by microbial fermentation.

The carcinogenicity of mineral fibres depends on their biopersistence in the respiratory system of a living being, that is to say their ability to be removed and/or degraded naturally by the body. This biopersistence of mineral fibres is characterized in particular by their solubility in a pulmonary fluid. According to Regulation No. 1272/2008 of the European Parliament and of the Council, mineral fibres are not categorized as carcinogenic if, during in vivo tests, the mineral fibres with a length of greater than 20 µm have a biopersistence such that their half life is less than 10 days for a test by inhalation or less than 40 days for a test by intratracheal instillation.

Article 7 of the same regulation clearly encourages the replacement of the tests on animals by in vitro tests. Thus, in vitro tests which simulate the two pulmonary environments which an inhaled mineral fibre is liable to encounter have thus been developed. They have the objective of measuring the rate of dissolution of the fibres in physiological solutions at pH 7.4 (for example, a Gamble's solution which simulates the pulmonary fluid) and at pH 4.5 (for example, a solution which simulates the environment inside the phagolysosomes of macrophages and at the surface of activated macrophages). Examples of compositions of these physiological solutions are described in the following papers: Sebastian et al., Glass Science Technologies, 75(5), 263-270, 2002; Marques et al., Dissolution Technologies, 18(3), 15-28, 2011.

In the context of research studies targeted at developing more durable binders for mineral wools, that is to say binders based on compounds originating from natural resources which are renewable in the short term, problems of degradation of some mineral fibres soluble in an acidic physiological medium were encountered for some sizing compositions which contain acids, in particular polycarboxylic acids, or which release acids during the phase of crosslinking of the binder. This is in particular the case with acidic sizing compositions, which generally have a pH of between 1 and 5, during the contact thereof with the fibres, and which at least partially dissolve some fibres. Consequently, the mechanical properties of the final product may become mediocre.

The present invention solves these problems. It turns out that a specific biosourced resin makes it possible to advantageously replace the known binders for binding mineral fibres biosoluble at acidic pH. This resin is based on poly(furfuryl alcohol), a furfural derivative obtained by treatment of biomass. It makes it possible to efficiently bind mineral fibres biosoluble at pH 4.5 without dissolving them and to thus obtain mineral wool insulating products which observe the criteria of non-toxicity and which exhibit excellent mechanical properties. This result is also obtained with a neutralized resin based on poly(furfuryl alcohol).

The present invention more particularly relates to a process for the manufacture of an insulating product based on mineral fibres bonded by an organic binder, comprising the following stages:

a. the application of a sizing composition to the said mineral fibres,
b. the formation of an assembly of the said mineral fibres,
c. the heating of the said assembly of mineral fibres until the said sizing composition has cured (that is to say, crosslinked), so as to form an insoluble binder, the said process being characterized in that:
the said sizing composition comprises the following constituents within the limits defined below, expressed as fractions by weight with respect to the total weight of the composition:
from 80% to 98% of water,
from 2% to 20% of water-soluble poly(furfuryl alcohol),
less than 0.5% of furfuryl alcohol, and
the said mineral fibres are fibres of aluminosilicate glass comprising aluminium oxide, $Al_2O_3$, in a fraction by weight of between 14% and 28%.

The resins used in the sizing composition which can be used according to the invention are furfuryl alcohol oligomers. They are water-soluble, that is to say miscible in any proportion with water. They are obtained by polycondensation of furfuryl alcohol in the presence of an acid catalyst. They generally exhibit an acidic pH between approximately 4.5 and 5.5, a low content of furfuryl alcohol (fraction by weight of less than 1%) and a viscosity at 25° C. of less than 1000 mPa·s at a solids content of 75% according to the Brookfield method described in Standard ASTM D2983.

For the requirements of the invention, the resin can be diluted and/or additivated with pH-correcting agents.

The sizing composition which can be used according to the present invention thus essentially comprises:
water,
furfuryl alcohol oligomers, hereinafter known as poly(furfuryl alcohol),
generally, but in a low proportion, residual unreacted furfuryl alcohol,
and, optionally, a salt resulting from the neutralization of the organic or inorganic acid which has been used as polycondensation catalyst.

The sizing composition can contain a certain number of additives conventionally present in dilute sizing compositions intended to be applied to fibres. These additives can be added at the time of the dilution of the composition or to the concentrated composition before dilution with water. These additives must be chemically stable and must not react with the components of the sizing composition which can be used according to the present invention, when this sizing composition is stored under storage conditions similar to those used for the furfuryl alcohol resin which it contains. Examples of additives are:

coupling agents chosen from functional silanes; a functional silane generally comprises at least one, preferably two or three, hydrolysable alkoxysilyl functional groups and at least one reactive functional group (oxirane, amine, hydroxyl, halide functional group) carried by a non-hydrolysable organic group bonded to the silicon atom by an Si—C bond;
hydrophobic agents, for example silicones;
dust-preventing agents, in particular mineral oils generally added in the form of an aqueous emulsion, optionally in the presence of one or more surface-active agents;
flame retardants, for example of phosphate or organophosphate type;
antistatic, softening or conditioning, or colouring agents;
soluble or dispersible organic fillers (extenders) and also particulate solid additives, such as opacifying agents.

The fraction by weight of adjuvants and additives of the solid part of the sizing composition generally does not exceed 20% to 25%.

In the sizing composition of the present invention, the sum of the fractions by weight of the poly(furfuryl alcohol) and of the water is advantageously at least 95%, preferably at least 96%, in particular at least 97% and ideally at least 98%.

The fraction by weight of poly(furfuryl alcohol) in the sizing composition is between 2% and 20%, preferably between 5% and 15%.

These values for fractions by weight of water and poly(furfuryl alcohol) are necessary in order for the sizing composition to have a suitable viscosity, generally of less than a few tens of mPa·s at 25° C. according to the Brookfield method described in Standard ASTM D2983, in order to be able to be applied to the mineral fibres by spraying.

The residual content of furfuryl alcohol monomer of the solution of the present invention is preferably as low as possible. This is because furfuryl alcohol (CAS number 98-00-0) is a volatile organic compound (VOC) regarded as harmful by skin contact, inhalation and ingestion. The fraction by weight of furfuryl alcohol in the sizing composition is less than 0.5%, preferably less than 0.1%.

At high temperature, the resin included in the sizing composition crosslinks by polycondensation in the presence of an acid catalyst and forms an insoluble binder. Consequently, the sizing composition is generally acidic. However, it can be neutralized by the addition of a base in order to increase the stability on storage thereof, that is to say to reduce the rate at which the resin spontaneously reacts at the storage temperature so that its viscosity increases. Such a neutralization can be advantageous for the transportation or the storage of the sizing solution.

The sizing composition according to the invention thus has a pH of between 3.0 and 10.0, preferably between 4.0 and 9.0, in particular within the range from 5.0 to 8.5 and ideally within the range from 6.0 to 8.0.

The sensitivity of the fibres of aluminosilicate glass to acids depends on the content of aluminium oxide which they contain. In aluminosilicate glasses, the aluminium is in the $Al^{3+}$ ionic form. The aluminium ions are "network formers" as they participate in the structure of the glass by forming coordination tetrahedra with the oxygen ions, one or more of the said oxygen atoms being shared with coordination tetrahedra formed by the silicon in the $Si^{4+}$ ionic form. In point of fact, aluminium oxide is an amphoteric compound, that is to say that it behaves both as a base and as an acid. This property has the consequence of rendering it particularly reactive, even when it is present in a glass. When a fibre of aluminosilicate glass comprising aluminium oxide is in contact with an acidic medium, the said medium reacts preferentially with the aluminium ions, thus destroying the network which the $Al^{3+}$ ions form with the silicon ions, and dissolving the glass. The aluminium oxide content of the fibres of aluminosilicate glass is thus an essential and determining characteristic of their degree of solubility in acidic media.

Fibres of aluminosilicate glass become soluble in acidic media when the fraction by weight of aluminium oxide which they contain is at least 14%, in particular at least 16%, indeed even at least 18%. The maximum fraction by weight of aluminium oxide generally does not exceed a certain limit beyond which the manufacture of the fibres become particularly difficult. It is at most 28%, preferably at most 26%, indeed even at most 24%.

In embodiments of the invention, it is advantageous for the mineral fibres of aluminosilicates to be more sensitive to acids in order to reduce their biopersistence such that their half life is less than certain values established by specific regulatory requirements or public health policies or also according to the manufacturer's own wish.

Some of these embodiments consist in adding other oxides to the said mineral fibres or also in changing the fractions by weight of the oxides which they comprise.

According to a first embodiment, because silicon, in its ionic form, participates in the formation of the structure of the said fibres, the fraction by weight of silicon oxide, $SiO_2$, which the said fibres contain is adjusted. Thus, the sensitivity to acids increases when this fraction by weight is within the range extending from 32% to 50%, in particular from 33% to 48%, indeed even from 34% to 46%.

As aluminium and silicon both participate in the formation of the structure of the aluminosilicate glass, it is also possible to add silicon oxide so that the sum of the fractions by weight of the aluminium oxide $Al_2O_3$ and of the said silicon oxide $SiO_2$ are within a certain interval of values. The sum of the $Al_2O_3$ and $SiO_2$ fractions by weight of the said mineral fibres is preferably between 46% and 78%, in particular between 47% and 76%, indeed even between 48% and 74%.

In another embodiment of the invention, the composition of the mineral fibres can be such that the $Al^{3+}/(Al^{3+}+Si^{4+})$ molar ratio is greater than 0.25, in particular greater than 0.30, preferably greater than 0.35.

The fibres of aluminosilicate glass can additionally comprise other oxides, such as oxides of alkali metals and of alkaline earth metals. The alkali metals or alkaline earth metals have a role of modifying the network formed by the coordination tetrahedra around $Si^{4+}$ and $Al^{3+}$ ions. The sensitivity of the mineral fibres to acids can be affected by the nature and the amount of alkali metal and alkaline earth metal oxides.

The mineral fibres according to one embodiment of the present invention can thus comprise the oxides CaO and MgO, the sum of the fractions by weight of the said oxides preferably being between 7% and 32%. They can also comprise the oxides $Na_2O$ and $K_2O$ in amounts such that the sum of the fractions by weight of the said oxides is between 1% and 15%, preferably between 2% and 15%.

The aluminosilicate mineral fibres used in the present invention preferably exhibit a dissolution coefficient calculated from the amount of $SiO_2$ of the said mineral fibres which is dissolved in a synthetic pulmonary fluid of pH 4.5, thermally regulated at 37° C., after immersion in the said fluid for 14 days. An experimental protocol which makes possible the calculation of such a dissolution coefficient is described in a very precise manner by Sebastian K. et al. in EURIMA test guideline: In-vitro acellular dissolution of man-made vitreous silicate fibres, Glass Science and Technology, 2002, 75(5), pp 263-270.

Fibres of aluminosilicate glass having a dissolution coefficient of greater than 100 $ng \cdot cm^{-2} \cdot h^{-1}$, in particular greater than 200 $ng \cdot cm^{-2} \cdot h^{-1}$, preferably greater than 400 $ng \cdot cm^{-2} \cdot h^{-1}$, satisfy the requirements of Regulation No. 1272/2008 of the European Parliament and of the Council. During in vivo tests, their half life is less than 10 days for a test by inhalation or less than 40 days for a test by intratracheal instillation.

In a preferred embodiment of the process of the invention, stage (a) of application of the sizing solution to the mineral fibres can be carried out by spraying by means of spray nozzles. The application of the sizing composition preferably precedes the assembling stage (b), during which the sized fibres are gathered together, for example in a mould or on a conveyor, before being heated, consecutively or extemporaneously, in order to crosslink and cure the binder. The fibres can be assembled:
  into flexible mats which can be rolled up and can be compressed or can be folded,
  into blocks or panels of fibres which are denser and more rigid than the mats which can be rolled up,
  into moulded products based on fibres, for example linings of conduits or pipes,
  into nonwoven textiles, such as nonwoven mats of glass fibres.

Stage (c) of heating the assembly of fibres is preferably carried out at a temperature of between 100° C. and 250° C. for a period of time of between 1 minute and 10 minutes, preferably in a thermally regulated atmosphere.

Another subject-matter of the present invention is a product capable of being obtained by any one of the embodiments of the process of the invention. The product obtained, which will comprise a furfuryl alcohol polymer, will exhibit a dimensional stability, a tensile strength and a thickness recovery after compression which are superior to those of a product obtained according to the state of the art and comprising a binder based on polymers of carboxylic acids and/or saccharides, this being the case for one and the same type of mineral fibres having a fraction by weight of aluminium oxide between 14% and 28%.

The contribution of the present invention is clearly illustrated by the two examples described below and the figures to which these two examples refer.

Figure 1:
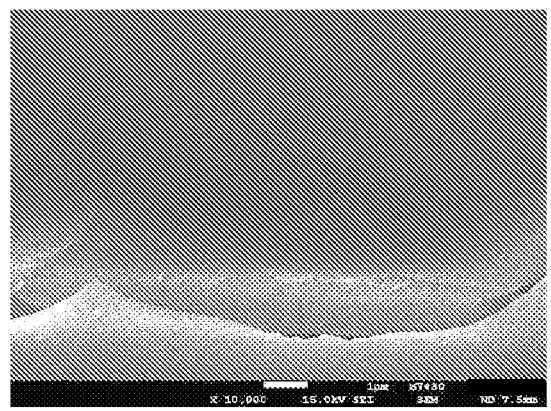
FIG. 1 is an electron micrograph of the interface between a flat mineral substrate having the composition Glass 1 and an organic coating obtained by crosslinking the sizing composition 1 (comparative).

In the examples, a sizing composition which can be used according to the invention is compared with two sizing compositions which are according to the state of the art and which do not make it possible to solve the technical problem. The sizing composition which can be used according to the invention was used on two glass compositions for mineral fibres sensitive to acids. For comparison purposes, the two sizing compositions according to the state of the art were used on the same two glass compositions for mineral fibres sensitive to acids.

The quality of the effect of the acidity of the sizing compositions was determined by comparing the quality of the interfaces formed between the said sizing compositions, once cured or crosslinked, and the two glass compositions for mineral fibres put into the form of flat substrates. The use of flat substrates, instead of fibres, is preferred for practical reasons. This is because they make it possible to simulate the interface between the fibres and the said sizing compositions and to make easier the observation thereof using a microscope. The quality of the interface provides qualitative information on the level of adhesion between the substrate and the fibre, in particular after an ageing test. In particular, the presence of cracks or of detachments will be the manifestation of a deterioration in the surface of the substrate by the sizing composition which has been deposited thereon.

The two glass compositions biosoluble at pH 4.5 used for the flat substrates are those presented in Table 1. The substrates were manufactured according to the usual methods of the glass industry. This table also shows the values of the sums of the fractions by weight, $Al_2O_3+SiO_2$, $CaO+MgO$ and $Na_2O+K_2O$, of the $Al^{3+}/(Al^{3+}+Si^{4+})$ molar ratio and of the dissolution coefficient, k, calculated from the amount of $SiO_2$ of the said glass fibres which is dissolved in a synthetic pulmonary fluid of pH 4.5, thermally regulated at 37° C., after 14 days, according to the protocol which was referred to above.

The three sizing compositions, and also their pH values, are described in Table 2. The sizing compositions 1 and 2 correspond to sizing compositions according to the state of the art. The sizing composition 3 is a sizing composition which can be used according to the invention.

The sizing composition 1 is prepared in two stages:
a) maleic anhydride and tetraethylenepentamine are mixed in a first container and then the mixture is put in reserve at a temperature of between 20° C. and 25° C. for 15 minutes;
b) the mixture obtained in stage a), the sucrose, the ammonium sulfate and the silane are mixed with stirring until the constituents have completely dissolved.

The sizing compositions 2 and 3 are prepared by mixing all of the constituents in a single stage.

For the purposes of the tests, the sizing compositions have a greater concentration of resin than the sizing compositions used for the application to the mineral fibres. The concentration of each composition is chosen in order for the viscosity to be suitable for application to a flat substrate, and the conditions of the heat treatment are chosen in order for the kinetics of the possible reactions between the said sizing compositions and the said substrates to be accelerated. The same results can be obtained with sizing compositions exhibiting a greater degree of dilution of resin by allowing the water which they contain to further evaporate. The test is thus representative of the formation of a film of binder at the surface of the glass under the conditions of manufacture of the mineral wool.

The protocol used for the test of determining the quality of the effect of the acidity is as follows:
cleaning the surfaces of the flat substrates with deionized water and with ethanol;
flame treating the said surface using a laboratory burner, so as to remove any contamination of organic nature;
cooling the surfaces to ambient temperature;
depositing the sizing compositions on the flat substrates by screen printing in order to form a cured or crosslinked coating having a thickness of approximately 20 µm;
curing the samples thus manufactured at 210° C. for 20 min in a suitable oven, the oven having been preheated to 550° C. and then cooled in order to prevent any contamination of organic nature;
accelerated ageing of the samples in an autoclave at 105° C., 1.2 bars for 15 min;
cutting the samples in cross section so as to be able to observe the interface between the organic coating and the flat substrate;
observing the sections thus obtained using a scanning electron microscope, the acceleration voltage of which is set at 15 kV, the magnification of which is set at ×10 000 and the detection mode of which is the secondary electron detection mode.

TABLE 1

Compositions of the glass fibres, expressed in fractions by weight of oxides.

|  | Glass 1 | Glass 2 |
|---|---|---|
| $SiO_2$ | 43 | 41.5 |
| $Al_2O_3$ | 24.2 | 15.4 |
| $Na_2O$ | 6.6 | 1.7 |
| $K_2O$ | 4 | 1.5 |
| CaO | 14.5 | 25.6 |
| MgO | 1.5 | 6.4 |
| $Fe_2O_3$ | 5.5 | 5.5 |
| $B_2O_3$ | — | — |
| $P_2O_5$ | 0.7 | 0.4 |
| $Al_2O_3 + SiO_2$ | 67.2 | 56.9 |
| CaO + MgO | 16 | 32 |
| $Na_2O + K_2O$ | 10.6 | 3.2 |
| k (ng · cm$^{-2}$ · h$^{-1}$) | ~600 | ~250 |
| $Al^{3+}/(Al^{3+} + Si^{4+})$ | 0.40 | 0.30 |

TABLE 2

Compositions of the sizing solutions, expressed in fractions by weight of the dry constituents.

|  | Composition 1 (comparative) | Composition 2 (comparative) | Composition 3 (invention) |
|---|---|---|---|
| Sucrose | 34 |  |  |
| Tetraethylenepentamine | 4.9 |  |  |
| Maleic anhydride | 5.1 |  |  |
| Ammonium sulfate | 6 |  |  |
| Maltitol |  | 30.3 |  |
| Citric acid |  | 24.6 |  |
| Poly(furfuryl alcohol) |  |  | 66.3 |
| Sodium hypophosphate |  | 2.4 |  |
| Silane | 2.5 | 2.4 | 2.5 |
| Water | 47.5 | 40.3 | 31.2 |
| pH | 6 | 1-2 | 5 |

EXAMPLE 1

Figure 2:
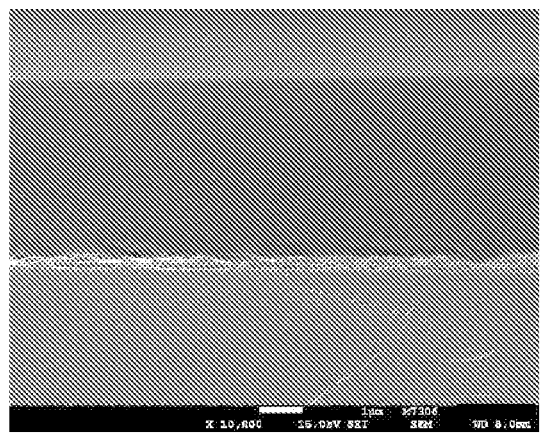
FIG. 2 is an electron micrograph of the interface between a flat mineral substrate having the composition Glass 1 and an organic coating obtained by crosslinking the sizing composition 2 (comparative).
Figure 3:
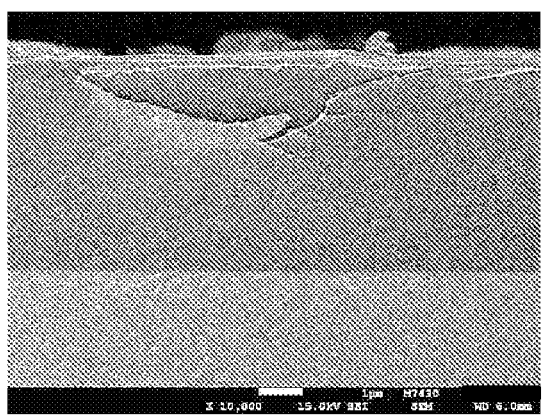
FIG. 3 is an electron micrograph of the interface between a flat mineral substrate having the composition Glass 1 and an organic coating obtained by crosslinking the sizing composition 3 (which can be used according to the invention).

In the first example, the three sizing compositions of Table 2 were deposited on a flat substrate with the composition Glass 1 of Table 1 according to the protocol described above. FIGS. 1, 2 and 3 exhibit the electron micrographs of the interfaces obtained between the said substrate and the three organic coatings respectively. The substrate is located at the bottom of the micrographs and the coating at the top.

In FIGS. 1 and 2, which are obtained with sizing compositions according to the state of the art, the interfaces are degraded. In FIG. 1, the interface is cracked and fractured. In FIG. 2, the interface exhibits microcracks which propagate in the substrate and the organic coating. On the other hand, in FIG. 3, which corresponds to a product obtained with a sizing composition which can be used according to the invention, the interface is smooth and flat and does not exhibit any cracking or detachment defect.

EXAMPLE 2

Figure 4:
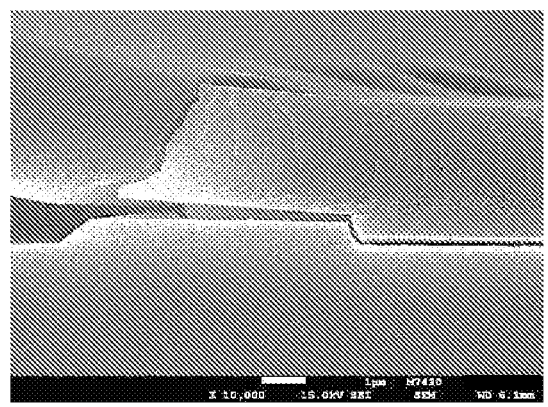
FIG. 4 is an electron micrograph of the interface between a flat mineral substrate having the composition Glass 2 and an organic coating obtained by crosslinking the sizing composition 1 (comparative).
Figure 5:
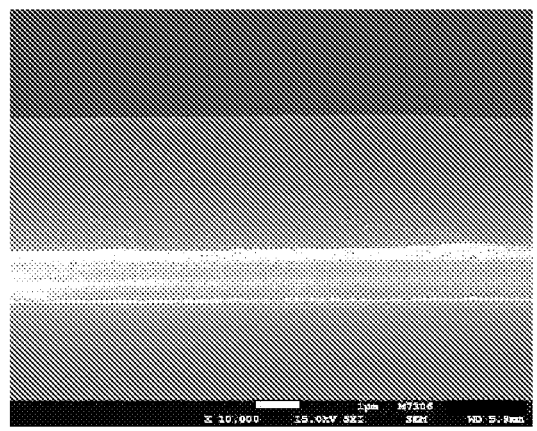
FIG. 5 is an electron micrograph of the interface between a flat mineral substrate having the composition Glass 2 and an organic coating obtained by crosslinking the sizing composition 2 (comparative).
Figure 6:
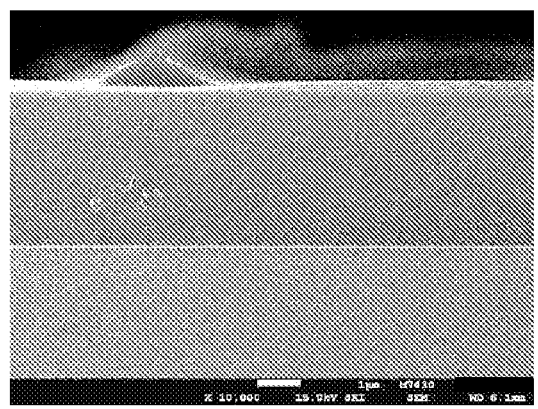
FIG. 6 is an electron micrograph of the interface between a flat mineral substrate having the composition Glass 2 and an organic coating obtained by crosslinking the sizing composition 3 (which can be used according to the invention).

In the second example, the three sizing compositions of Table 2 were deposited on a flat substrate with the composition Glass 2 of Table 1 according to the protocol described above. FIGS. 4, 5 and 6 exhibit the electron micrographs of the interfaces obtained between the said substrate and the three organic coatings respectively. The substrate is located at the bottom of the micrographs and the organic coating at the top. In FIGS. 4 and 5, which are obtained with sizing compositions according to the state of the art, the interfaces are degraded. They are cracked and fractured with a pronounced separation of the material. On the other hand, in FIG. 6, obtained with a sizing composition which can be used according to the invention, the interface is smooth and flat and does not exhibit any cracking or detachment defect.

EXAMPLE 3

In the third example, two industrial insulating products were manufactured using two sizing compositions, one according to the state of the art and the other which can be used according to the invention. These two sizing compositions respectively correspond to the sizing compositions 1 and 3 with a greater dilution. The fractions by weight of their constituents are shown in Table 3. The composition of the mineral fibres on which these two sizing compositions were applied is that of Glass 1 of Table 1. The mineral fibres were coated with sizing composition before being assembled and heated at 200° C. The density of the industrial products obtained is approximately 16 kg·m³. The fraction by weight of binder in the final product, obtained following the drying and the curing of the sizing compositions, is approximately 5%.

The mechanical strength of the insulating products depends on the quality of the interfaces between the binder and the fibres. This quality can change over time with the ageing of the product. It can in particular degrade. This degradation increases as the degree of degradation of the mineral fibres by the binder or the degree of degradation of the binder itself increases. The measurement of the variations in the mechanical strength before and after ageing thus provides a qualitative and quantitative indication of the degree of degradation of the mineral fibres by the binder or of the degree of degradation of the binder itself.

For the purposes of demonstrating the advantages of the invention, the two insulating products were subjected to a climatic treatment for 15 minutes in a chamber thermally regulated at 105° C. with a relative humidity of 100% in order to simulate their ageing in accelerated fashion. The tensile strength of the industrial insulating products, before and after climatic treatment, was measured using a mechanical test according to Standard ASTM C686-71T. Before and after climatic treatment, a series of samples was cut out from each product by stamping. Each sample has the shape of a ring having a length of 122 mm, a width of 46 mm, a radius of curvature of the cut-out of the exterior edge equal to 38 mm and a radius of curvature of the cut-out of the interior edge equal to 12.5 mm. The sample is positioned between two cylindrical mandrels of a testing device, one of which is movable and moves at a constant rate. The tensile strength is the ratio of the breaking force F, measured in newtons, to the weight W of the sample. The unit of the tensile strength is the newton/gram or $N \cdot g^{-1}$.

The values of the mechanical strengths of the two products before and after climatic treatment are shown in Table 4. Before climatic treatment, the two insulating products have comparable tensile strength values. This is remarkable and all the more surprising as the size according to invention is 10 times more acidic than the size of the comparative example. After climatic treatment, the value of the tensile strength of the product 1, manufactured using a sizing composition according to the state of the art, decreases by 53%, whereas that of the product 2, manufactured using a sizing composition which can be used according to the invention, only decreases by 14%. After ageing, the loss in tensile mechanical strength is thus nearly four times smaller for a product capable of being obtained according to the invention than for a product capable of being obtained according to the state of the art.

TABLE 3

Compositions of the sizing solutions, expressed in fractions by weight of the dry constituents.

|  | Composition 1, diluted (comparative) | Composition 3, diluted (invention) |
|---|---|---|
| Sucrose | 3.9 |  |
| Tetraethylenepentamine | 0.5 |  |
| Maleic anhydride | 0.6 |  |
| Ammonium sulfate | 0.7 |  |
| Poly(furfuryl alcohol) |  | 5.8 |
| Furfuryl alcohol |  | <0.02 |
| Silane | 0.3 | 0.2 |
| Water | 94 | 94 |

TABLE 4

Tensile strengths ($N \cdot g^{-1}$) of the industrial insulating products manufactured using the sizing composition of Table 3.

|  | Product 1 (comparative) | Product 3 (invention) |
|---|---|---|
| Composition of the mineral fibres | Glass 1 | Glass 1 |
| Sizing composition | Composition 1, diluted | Composition 3, diluted |
| Tensile strength | | |
| Before treatment climatic | $3.8 \: N \cdot g^{-1}$ | $3.6 \: N \cdot g^{-1}$ |
| After climatic treatment | $1.8 \: N \cdot g^{-1}$ | $3.1 \: N \cdot g^{-1}$ |

The invention claimed is:

1. A process for the manufacture of an insulating product based on mineral fibres bonded by an organic binder, comprising:
    a. applying a sizing composition to the mineral fibres,
    b. forming an assembly of the mineral fibres,
    c. heating said assembly of mineral fibres until the sizing composition has cured,
    wherein:
    the sizing composition comprises the following constituents within the limits defined below, expressed as fractions by weight with respect to the total weight of the composition:

from 80% to 98% of water, from 2% to 20% of water-soluble poly(furfuryl alcohol), which is obtained by polycondensation of furfuryl alcohol, and less than 0.5% of furfuryl alcohol, the mineral fibres are fibres of aluminosilicate glass comprising aluminium oxide, $Al_2O_3$, in a fraction by weight of between 14% and 28%, wherein a sum of the fractions by weight of the poly(furfuryl alcohol) and of the water is at least 95%, and wherein the sizing composition applied to the mineral fibres has a pH in a range from 5 to 8.

2. The process according to claim 1, wherein the mineral fibres have a fraction by weight of $SiO_2$ of between 32% and 50%.

3. The process according to claim 1, wherein a sum of the $Al_2O_3$ and $SiO_2$ fractions by weight of the mineral fibres is between 46% and 78%.

4. The process according to claim 1, wherein the mineral fibres have an $Al^{3+}/(Al^{3+}+Si^{4+})$ molar ratio of greater than 0.25.

5. The process according to claim 4, wherein the mineral fibres have an $Al^{3+}/(Al^{3+}+Si^{4+})$ molar ratio of greater than 0.35.

6. The process according to claim 1, wherein the mineral fibres additionally comprise the oxides CaO and MgO, a sum of the fractions by weight of the oxides being between 7% and 32%.

7. The process according to claim 1, wherein the mineral fibres additionally comprise the oxides $Na_2O$ and $K_2O$, a sum of the fractions by weight of the oxides being between 1% and 15%.

8. The process according to claim 1, wherein the mineral fibres have a dissolution coefficient of greater than 100 $ng \cdot cm^{-2} \cdot h^{-1}$, the dissolution coefficient being calculated from the amount of $SiO_2$ of the mineral fibres which is dissolved in a synthetic pulmonary fluid of pH 4.5, thermally regulated at 37° C., after 14 days.

9. The process according to claim 8, wherein the dissolution coefficient is greater than 400 $ng \cdot cm^{-2} \cdot h^{-1}$.

10. The process according to claim 1, wherein a content of furfuryl alcohol of the sizing composition is less than 0.1%.

11. The process according to claim 1, wherein said sizing composition additionally comprises one or more adjuvants chosen from coupling agents, dust-preventing agents, hydrophobic agents, retardants, antistatic agents, softening agents, conditioning agents, colouring agents or opacifying agents.

12. The process according to claim 11, wherein a fraction by weight of adjuvants and additives of the solid part of the sizing composition does not exceed 25%.

13. The process according to claim 12, wherein the fraction by weight of adjuvants and additives of the solid part of the sizing composition does not exceed 20%.

14. The process according to claim 1, wherein the application of the sizing composition of stage a) to the mineral fibres is carried out by spraying by means of spray nozzles.

15. The process according to claim 1, wherein stage c) comprises the heating of the assembly of mineral fibres at a temperature of between 100° C. and 250° C. for a period of time of between 1 minute and 10 minutes.

16. The process according to claim 15, wherein the heating of the assembly of mineral fibres is in a thermally regulated atmosphere.

17. The process according to claim 1, wherein a sum of the fractions by weight of the poly(furfuryl alcohol) and of the water is at least 98%.

18. The process according to claim 1, wherein the pH is from 6.0 to 8.0.

19. The process according to claim 1, wherein the pH is from 5.5 to 8.

\* \* \* \* \*